Jan. 27, 1942.  D. H. HUBBARD  2,271,011
TWO-STROKE CYCLE ENGINE
Filed Jan. 25, 1940  2 Sheets-Sheet 1
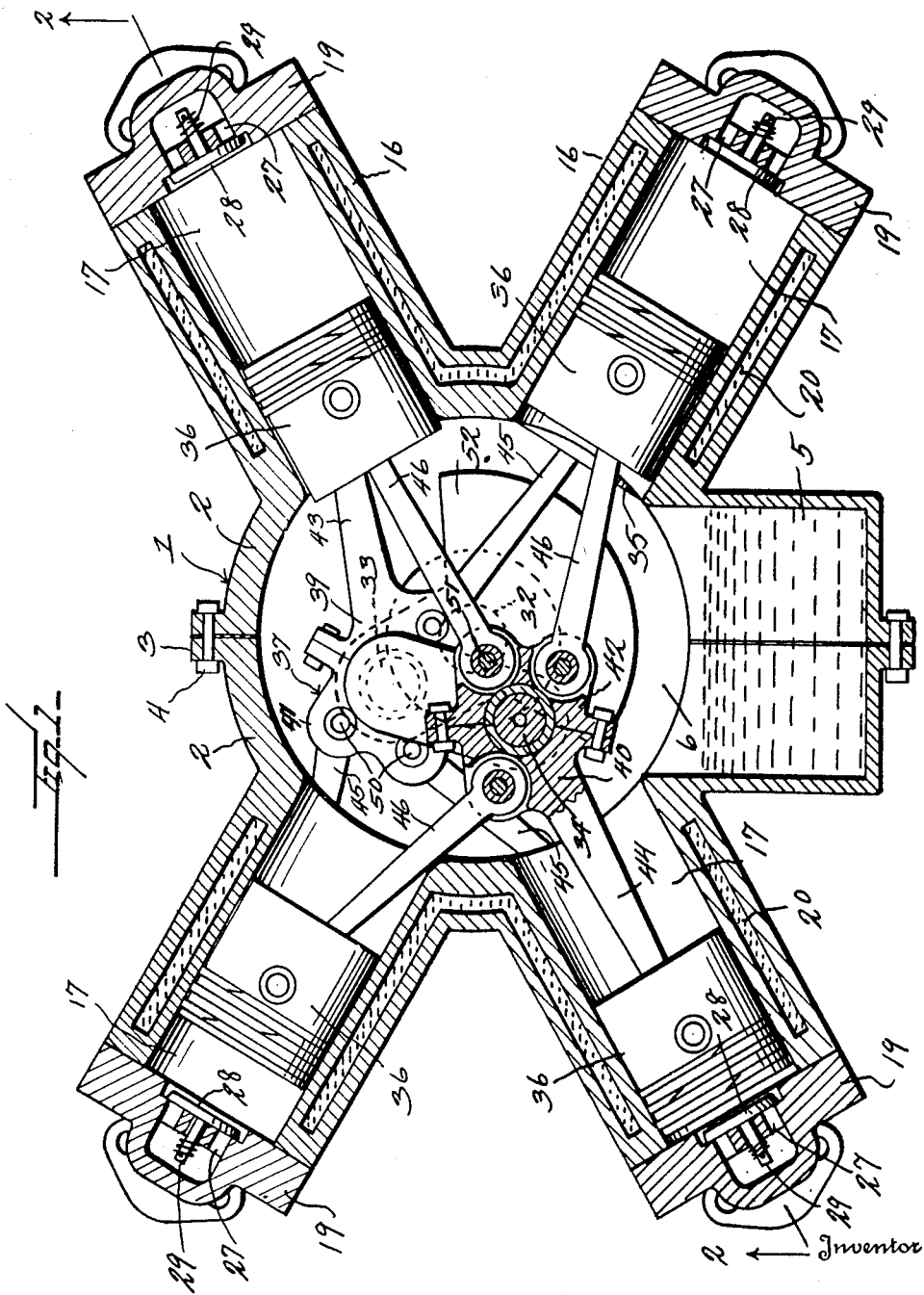
Inventor
D. H. Hubbard
By Watson E. Coleman
Attorney Jan. 27, 1942.　　　D. H. HUBBARD　　　2,271,011
TWO-STROKE CYCLE ENGINE
Filed Jan. 25, 1940　　　2 Sheets-Sheet 2
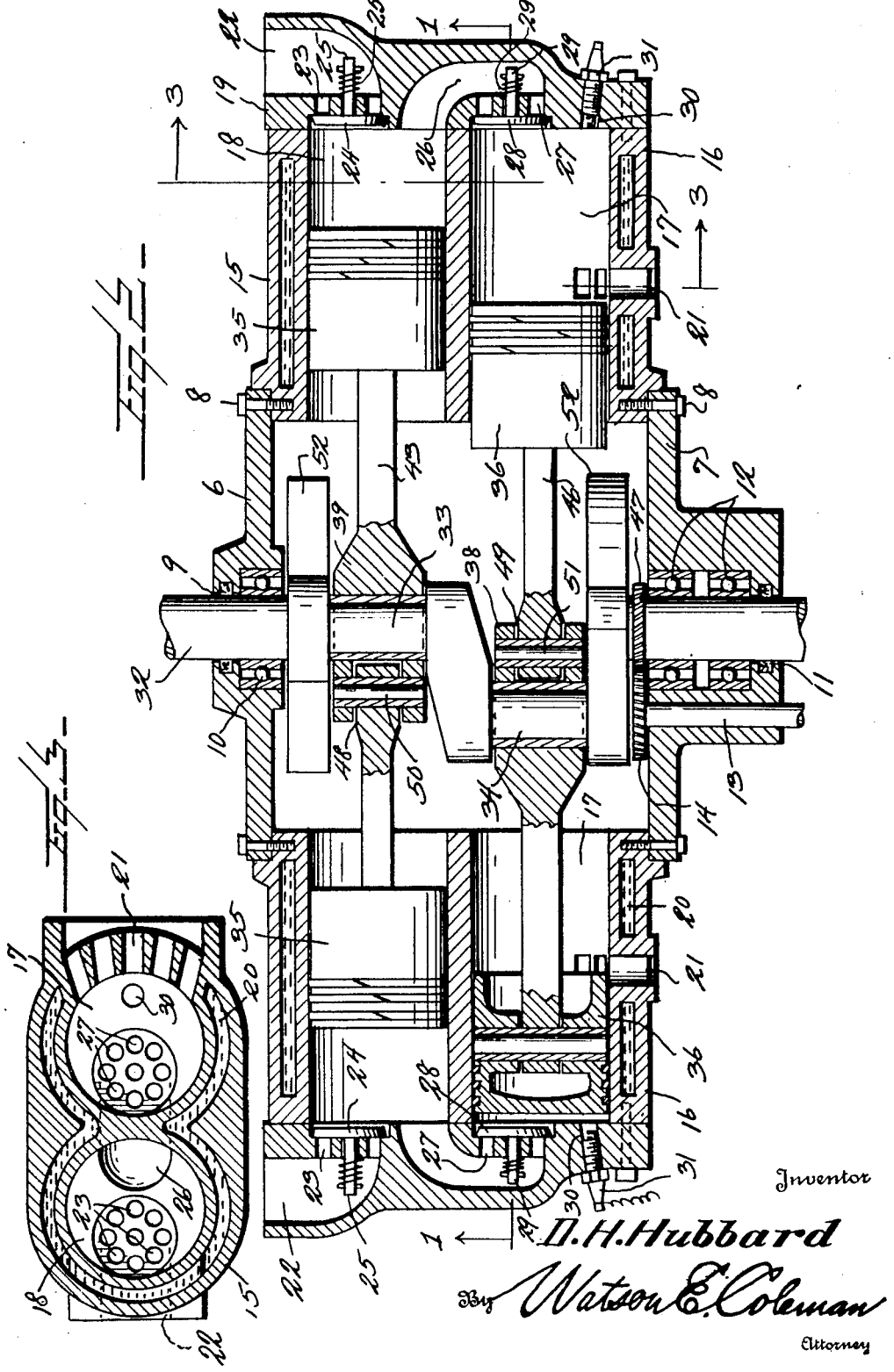
Inventor
D. H. Hubbard
By Watson E. Coleman
Attorney Patented Jan. 27, 1942

2,271,011

UNITED STATES PATENT OFFICE 2,271,011

TWO-STROKE CYCLE ENGINE

Deward H. Hubbard, Vernon, Tex.

Application January 25, 1940, Serial No. 315,579

4 Claims. (Cl. 123—55)

This invention relates to the class of internal combustion engines and pertains particularly to improvements in two-stroke cycle engines.

Two-stroke cycle internal combustion engines, or two-cycle engines as they are commonly called, at the present time have as their greatest drawback, the fact that it is not possible to control their speed through regulation of the carburetor by an accelerator control such as is commonly employed in association with four-cycle engines. As a result, the use of two-cycle engines is not as extensive as that of the four-cycle engine even though such engines operate under given conditions with more efficiency by reason of the fact that the firing cylinders operate to give a power impulse with each stroke of the piston whereas this is not the case in a four-cycle engine, and the number of parts required is less and the construction is simpler than that of the four-cycle engine.

The primary object of the present invention is to provide an improved engine structure wherein the two-stroke cycle motor principle is combined with the four-stroke cycle principle to obtain as a result all of the advantages possessed by the four-stroke cycle engine when operating at various speeds, the advantage of having a two-stroke cycle engine which has its speed controllable through the carburetor and to produce a motor of relatively simple construction through the elimination of cam shafts, cam gears, cam bearings, valve tappets, push rods, springs and other mechanical units which form necessary parts of engines of the four-stroke cycle type.

Another object of the invention is to provide an internal combustion engine of the two-cycle type having associated therewith means for taking in the operating fuel through a standard type of carburetor and compressing and transferring such fuel to a firing cylinder in such manner that the firing cylinder will be supplied with a maximum quantity of such fuel at each stroke of the piston therein and the mechanism employed for compressing the charge and transferring it from the carburetor to the firing cylinder will not be subjected to any back pressure set up by the firing piston as a result of which no excessive use of the power developed by the engine has to be employed for overcoming such back pressure and, therefore, the engine is enabled to operate at maximum efficiency.

Still another object of the invention is to provide an internal combustion engine of the two-stroke cycle type which is designed to be operated in association with a standard type of carburetor whereby the speed of the engine may be readily controlled, in association with compressor pistons employed for drawing in the fuel charge and transferring the same under slight pressure to the firing cylinders, which compressor pistons operate alternately with the firing pistons ahead of the same to prepare the firing charge for delivery to the firing cylinder when the latter cylinder capacity is at its maximum, thereby accomplishing the two-fold action of scavenging the firing cylinder by the incoming charge and of introducing the fresh charge under a relatively low pressure as a result of which the compressing action of the compressor or charging piston uses only a minimum amount of the power developed by the engine.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a sectional view taken through the engine constructed in accordance with the present invention at right angles to the crank shaft thereof and substantially upon the line 1—1 of Fig. 2.

Fig. 2 is a sectional view taken substantially upon the line 2—2 of Fig. 1.

Fig. 3 is a transverse sectional view taken upon the line 3—3 of Fig. 2 looking toward the cylinder head and showing the valves removed.

Referring now more particularly to the drawings, the numeral 1 generally designates the crank case of the engine comprising the present invention, which crank case is shown in Fig. 1 as being divided along a plane extending axially of the engine into two sections, each of which is designated by the numeral 2, and these sections are provided along their meeting edges by lateral flanges 3 which are bolted together, as indicated at 4. Each of the halves 2 of the crank case is enlarged outwardly upon its under side as shown in Fig. 1, to form a portion of an oil reservoir which is indicated generally by the numeral 5, and at the ends of the crank case there are secured the cover plates 6 and 7, these plates being held in position by tap bolts 8.

The plate 6 has a crank shaft opening 9 and supports a crank shaft bearing 10 while the plate 7 also has a crank shaft opening as indicated at 11 and supports, in alinement with such opening, a pair of crank shaft bearings 12. There is also formed through the hub portion of the plate 7, a suitable passage for a distributor shaft 13 upon the inner end of which shaft is carried a gear 14 for connection with a driving gear, hereinafter described, which is supported upon the engine crank shaft.

Integrally connected with or cast with each of the two halves of the crank case are two groups of cylinder bodies, one group being indicated by the numeral 15 while the other group is indicated by the numeral 16, and these groups of cylinder bodies are arranged to extend radially of the crank case, spaced substantially 60° apart or 30° from the horizontal and the groups of each crank case half are in the same plane perpendicularly to the engine axis as the corresponding groups of cylinder bodies of the other half of the crank case. Thus the engine as here illustrated is made up of four cylinder bodies 16 extending radially from the engine crank case and four parallel cylinder bodies 15 extending radially from the engine crank case, and the cylinder bodies 16 are formed to provide firing cylinders 17 while the bodies 15 have formed therein charging or compression cylinders 18. All of these cylinders naturally open into the crank case and the outer ends of each adjacent pair of cylinders 17 and 18 have secured thereover the valve carrying heads 19. The cylinder bodies are chambered around the cylinders to form a water jacket 20 and each of the cylinder bodies 16 has exhaust ports 21 opening laterally therethrough at substantially midway of its ends.

Each cylinder head 19 has a fuel intake port 22 leading inwardly to a fuel inlet 23 which is here shown as consisting of a series of apertures, upon the inner side of which is disposed a valve disk 24 which, when closed, covers these apertures. A stem 25, working in a suitable guide at the center of the inlet aperture is connected with the valve 24 and is surrounded by a light spring 25' which normally functions to seat the valve. The inlet aperture 23 of each head opens into the compressor cylinder 18 adjacent thereto and leading from each compressor cylinder through the adjacent head is a fuel transfer passage 26 which leads to the fuel intake port 27 which opens into the adjacent firing or combustion cylinder 17. Each of these intake ports has upon its inner side an intake valve disk 28 which is connected with a stem 29 passing through a suitable guide in the body of the head and controlled by a light spring 29'. These valve disks as well as the valve disks 24 are formed of a suitable light weight material whereby they may move freely to or from opened and closed positions under the action of pressures set up in the cylinders by the hereinafter described pistons, assisted by the light control springs mentioned.

Each head has a suitable aperture 30 for a firing plug 31, the timing of the firing of which is under the control of suitable switching mechanism controlled by the distributor shaft 13.

The numeral 32 designates the crank shaft which is supported by the bearings 10 and 12 and which extends longitudinally through the crank case. Within the case, the shaft 32 is formed to provide the cranks 33 and 34 and these cranks are offset from the center of rotation of the shaft in planes perpendicular to one another, thus making the cranks 90° apart.

In each of the compressor cylinders or charging cylinders is a charging piston 35 and in each of the firing cylinders is a firing piston 36.

The charging piston operating crank 33 has secured thereabout a yoke 37 and a similarly formed yoke, indicated by the numeral 38, is secured about the firing piston operating crank 34. Each of these yokes 37 and 38 consists of a body portion 39—40, respectively, and a cap portion 41—42, respectively, and the body portion of each yoke 37—38 has formed rigidly therewith the connecting rods 43—44, respectively, and the movable connecting rods 45—46, respectively. The movable connecting rods are pivotally coupled at their inner ends to their respective yokes. Thus it will be seen that as the cranks rotate all of the firing pistons will move in unison and all of the compressor pistons will move in unison but the pistons of the charging or compressor cylinders will be 90° in advance of the pistons of the firing cylinders. Thus it will be seen, if reference is had to Fig. 2 and to the pistons 35 and 36 at the left-hand side of this figure, considering the crank shaft 32 as turning clockwise, that if the firing piston 36 is at the limit of its inward movement where the charge of compressed fuel is about to be fired, the adjacent charging or compressor piston 35, being in advance of the firing piston, will be moving outward and drawing into its cylinder a fresh charge of fuel while the firing piston is delivering power. When the firing piston in question, that is, the one at the left-hand side of Fig. 2, reaches the limit of its outward movement, it will uncover the exhaust ports 21 and the pressure remaining in this cylinder will then completely collapse and will permit the inlet valve 28 to move to opened position so that the compressor charge may flow in from the adjacent cylinder 18. This inflowing charge will force out all remaining products of combustion from the previous charge and while the firing piston is starting its return inward movement, the compressor piston, being 90° in advance of the firing piston, will force over the remainder of the charge in the compressor cylinder. As soon as this action is completed, the pressure being developed in the firing cylinder will act, assisted by the light spring of the valve 28, to close this valve and also it will be apparent that this re-seating action will be further assisted through the outward movement of the compressor or charging piston 35 which is at the same time drawing in a fresh charge of fuel past the adjacent valve 24 from the port or inlet passage 22 which is connected with the engine carburetor. The valves 24 and 28 work freely under the action of pressures established within the cylinders, opening when such pressures are released or dropped, thus avoiding the necessity of employing the usual heavy spring for the actuation of such valves. In fact, it has been found that by using the light weight valve disks described, the engine will operate efficiently without employing any valve springs at all, but the use of the light springs described prevents the valves from clicking when the engine is operating at slow speed. As previously stated, any suitable type of distributor mechanism may be used for controlling the flow of electric current to the several firing plugs of the firing cylinders and such distributor is coupled with the distributor shaft 13, the gear 14 of which is connected with a suitable gear 47 carried upon the crank shaft 32.

While any suitable coupling means may be employed between the connecting rods 45 and 46 and their respective yokes, it will be seen that the means here described consists in providing these yokes 37 and 38, respectively, with suitable edge recesses 48 and 49 in which the ends of the connecting rods position to receive the pivot pins 50 and 51, respectively, for the two yokes mentioned.

In order to insure smooth rotation of the crank shaft, the same may be provided with counterbalancing weights 52, as shown.

What is claimed is:

1. A two-cycle engine, comprising a crank case, a crank shaft extending through said case and having a pair of cranks, a plurality of firing cylinders integral with said crank case and extending radially with respect to said crank shaft in a common plane having one of said cranks in said plane, a plurality of pistons in said cylinders each operatively coupled with the said one of the cranks, a plurality of compression cylinders arranged to extend radially with respect to said crank shaft and in a common plane extending transversely thereof and having the other crank in said last mentioned plane, a piston in each of the compression cylinders, means operatively coupling the compression cylinder pistons with the said other crank, a fuel inlet port leading into each compression cylinder, a free moving inwardly opening valve for each port permitting fuel to flow only into the compression cylinders, a fuel transfer passage leading from each compression cylinder to a firing cylinder, a control valve for each passage opening into the adjacent firing cylinder, an exhaust port for each firing cylinder which is uncovered by the adjacent firing piston when the latter is at the limit of its outward movement, means for igniting a fuel charge in each firing cylinder, and said cranks being angularly related to move the compression cylinder pistons on their compression strokes in advance of and for a period during the compression strokes of the firing cylinder pistons.

2. An internal combustion engine comprising the combination of a compressor cylinder, a firing cylinder, a piston in each of said cylinders, a pressure operated check valve for admitting fuel into said compressor cylinder and a pressure operated check valve for admitting fuel from said compressor cylinder to said firing cylinder, an exhaust port in said firing cylinder adjacent the end of the stroke of said firing piston, a crank shaft, and connections between said crank shaft and said pistons whereby said exhaust port is uncovered by said firing piston when fuel in said compressor cylinder is under pressure by said compressor piston and whereby said compressor piston traverses substantially the latter half of its compression stroke while said firing piston traverses substantially the first half of its compression stroke.

3. An internal combustion engine according to claim 2 wherein said first mentioned check valve permits intake of fresh fuel for substantially the full stroke of said compressor piston, and said second mentioned check valve permits completion of the transfer of fuel from said compressor cylinder to said firing cylinder during substantially the first half of the compression stroke of said firing piston.

4. An internal combustion engine according to claim 2 comprising a plurality of pairs of said compressor and firing cylinders and pistons therefor, a crank on said shaft for all of said compressor pistons, and a second crank on said shaft for all of said firing pistons.

DEWARD H. HUBBARD.